(12) United States Patent
Choi et al.

(10) Patent No.: US 12,711,573 B2
(45) Date of Patent: Aug. 18, 2026

(54) ELECTRONIC APPARATUS, CONTROL METHOD THEREOF AND ELECTRONIC SYSTEM

(71) Applicant: SAMSUNG ELECTRONICS CO., LTD., Suwon-si (KR)

(72) Inventors: Kyuha Choi, Suwon-si (KR); Bongjoe Kim, Suwon-si (KR); Daeeun Kim, Suwon-si (KR); Taejun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 329 days.

(21) Appl. No.: 17/902,775

(22) Filed: Sep. 2, 2022

(65) Prior Publication Data

US 2022/0414828 A1 Dec. 29, 2022

Related U.S. Application Data

(63) Continuation of application No. 17/464,119, filed on Sep. 1, 2021, now Pat. No. 11,455,706, which is a (Continued)

(30) Foreign Application Priority Data

Sep. 15, 2020 (KR) ........................ 10-2020-0118199

(51) Int. Cl.
*G06T 3/4046* (2024.01)
*H04N 19/33* (2014.01)

(52) U.S. Cl.
CPC ........... *G06T 3/4046* (2013.01); *H04N 19/33* (2014.11)

(58) Field of Classification Search
CPC .............................. G06T 3/4046; H04N 19/33
(Continued)

(56) References Cited

U.S. PATENT DOCUMENTS 10,147,202 B2 12/2018 Nystad et al.
10,819,992 B2 10/2020 Park et al.
(Continued)

FOREIGN PATENT DOCUMENTS

KR 10-1323608 11/2013
KR 10-2019-0097205 8/2019
(Continued)

OTHER PUBLICATIONS

Extended European Search Report dated Jul. 27, 2023 in European Patent Application No. 21869543.5.
(Continued)

*Primary Examiner* — Mark Roz
(74) *Attorney, Agent, or Firm* — Nixon & Vanderhye, P.C.

(57) ABSTRACT

An electronic apparatus includes a memory configured to store a downscaling network of a first artificial intelligene model, a communication interface comprising communication circuitry, and a processor connected to the memory and the communication interface and configured to control the electronic apparatus, wherein the processor is configured to: obtain an output image in which an input image is downscaled by inputting the input image the downscaling network, control the communication interface to transmit the output image to another electronic apparatus, and wherein the first artificial intelligene model is configured to be learned based on: a sample image, a first intermediate image obtained by inputting the sample image to the downscaling network, a first final image obtained by inputting the first intermediate image to an upscaling network of the first artificial intelligene model, a second intermediate image in which the sample image is downscaled by a legacy scaler, and a second final image in which the first intermediate image is upscaled by the legacy scaler.

17 Claims, 16 Drawing Sheets

Related U.S. Application Data continuation of application No. PCT/KR2021/010561, filed on Aug. 10, 2021.

(58) Field of Classification Search
USPC .......................................................... 382/157
See application file for complete search history.

(56) References Cited

U.S. PATENT DOCUMENTS

| | | | | |
|---|---|---|---|---|
| 11,095,894 | B2 | 8/2021 | Jeon et al. | |
| 2014/0267283 | A1 | 9/2014 | Nystad et al. | |
| 2019/0005619 | A1 | 1/2019 | Michelini et al. | |
| 2019/0156144 | A1 | 5/2019 | Li et al. | |
| 2020/0053408 | A1 | 2/2020 | Park et al. | |
| 2020/0058126 | A1 | 2/2020 | Wang et al. | |
| 2020/0226717 | A1* | 7/2020 | Kim | H04N 19/172 |
| 2020/0349681 | A1 | 11/2020 | Andrei | |
| 2020/0389658 | A1 | 12/2020 | Kim et al. | |
| 2021/0027425 | A1 | 1/2021 | Kalchbrenner et al. | |

FOREIGN PATENT DOCUMENTS

| | | |
|---|---|---|
| KR | 10-2022648 | 9/2019 |
| KR | 10-2020-0009118 | 1/2020 |
| KR | 10-2020-0016879 | 2/2020 |
| KR | 10-2020-0044665 | 4/2020 |
| KR | 10-2164847 | 10/2020 |

OTHER PUBLICATIONS

Wanjie Sun, et al., “Learned Image Downscaling for Upscaling using Content Adaptive Resampler”, 2020CVPR, School of Remote Sensing and Information Engineering, Wuhan University, Nov. 5, 2019, 14 pages.

Choi et al., U.S. Appl. No. 17/464,119, filed Sep. 1, 2021, allowed.

Kim et al, Dynamic frame resizing with convolutional neural network for efficient video compression, SPIE 2017 (Year: 2017).

Lee et al, Learning with Privileged Information for Efficient Image Super-Resolution, ECCV 2020 (Year: 2020).

Sun et al, Learned Image Downscaling for Upscaling using Content Adaptive Resampler, IEEE 2020 (Year: 2020).

International Search Report and Written Opinion dated Nov. 24, 2021 in corresponding International Application No. PCT/KR2021/010561.

Communication under Rule 71(3) EPC dated Apr. 10, 2025 in European Application No. 21869543.5.

Office Action issued Apr. 8, 2026 in Korean Patent Application No. 10-2020-0118199 with translation.

Kim et al., “Task-Aware Image Downscaling”, Department of ECE, ASRI, Seoul National University, Seoul, Korea, issued Apr. 8, 2026, 16 pages.

Examination Report issued Jun. 30, 2026 in Indian Patent Application No. 202317018986 and English-language.

* cited by examiner

2:1 ScaleNet-DN Network

1:1 ScaleNet-ON Network

ELECTRONIC APPARATUS, CONTROL METHOD THEREOF AND ELECTRONIC SYSTEM

CROSS-REFERENCE TO RELATED APPLICATIONS

This application is a continuation of U.S. Application Ser. No. 17/464,119, filed Sep. 1, 2021, now U.S. Pat. No. 11,455,706, which is a continuation of PCT/KR2021/010561, filed Aug. 10, 2021, in the Korean Intellectual Property Receiving Office, which claims benefit of priority to Korean Patent Application No. 10-2020-0118199, filed on Sep. 15, 2020, in the Korean Intellectual Property Office, the disclosures of all of which are incorporated by reference herein in their entireties.

BACKGROUND

Field

The disclosure relates electronic apparatus, a control method thereof, and an electronic system. For example, the disclosure relates to an electronic apparatus for transmitting an image, a control method thereof, and an electronic system.

Description of Related Art

Recently, as image processing technology and display devices have been developed, 8K images with 7680×4320 resolution beyond ultra-HD (UHD) images with 3840×2160 resolution and display devices capable of reproducing them are being distributed.

However, when a high-resolution image is transmitted, problems such as bandwidth, time delay, or the like may occur. In order to address this, as shown in FIG. 1A, a device transmitting images downscales a high-resolution image through an artificial intelligence model and transmits the downscaled image, and a device receiving the image performs upscaling through the artificial intelligence model. In this process, if encoding and decoding operations are added, a high-resolution image may be transmitted more efficiently.

Here, the artificial intelligence model performing downscaling and the artificial intelligence model performing upscaling may be learned as one artificial intelligence model as shown in FIG. 1B. Specifically, an original image on the left is downscaled by the artificial intelligence model performing downscaling to obtain a first intermediate image, and the first intermediate image may be up scaled by the artificial intelligence model performing upscaling and a final image on the right may be obtained. In addition, the original image may be downscaled by a legacy scaler to obtain a second intermediate image. The artificial intelligence model performing downscaling and the artificial intelligence model performing upscaling may be learned based on a difference between the original image and the final image and a difference between the first intermediate image and the second intermediate image. Here, the legacy scaler is a rule-based scaler rather than an artificial intelligence model-based scaler.

However, a device in which an artificial intelligence model that performs upscaling is not stored, an upscaling performance of the received image may be deteriorated. For example, when a device receiving an image includes only a legacy scaler, the upscaling performance of the received image may be lower than that of a device in which an artificial intelligence model performing upscaling is stored.

In addition, although an image may be transmitted without downscaling in some cases, there is a problem in that the existing artificial intelligence model may not be used because it is based on downscaling.

Therefore, there is a need to develop a technique for addressing the problem described above.

SUMMARY

Embodiments of the disclosure provide an electronic apparatus for restoring close to an original even when downscaling is performed in an image transmission process, a control method thereof, and an electronic system.

According to an example embodiment of the disclosure, an electronic apparatus includes: a memory configured to store a downscaling network of a first artificial intelligene model, a communication interface including communication circuitry, and a processor connected to the memory and the communication interface and configured to control the electronic apparatus, wherein the processor is configured to: obtain an image in which an input image is downscaled by inputting the input image to the downscaling network, control the communication interface to transmit the output image to another electronic apparatus, and wherein the first artificial intelligene model is configured to be learned based on: a sample image, a first intermediate image obtained by inputting the sample image to the downscaling network, a first final image obtained by inputting the first intermediate image to an upscaling network of the first artificial intelligene model, a second intermediate image in which the sample image is downscaled by a legacy scaler, and a second final image in which the first intermediate image is upscaled by the legacy scaler.

The processor is configured to: encode the output image, and control the communication interface to transmit the encoded output image to the another electronic apparatus.

The first artificial intelligence model is configured to be learned based on: a weighted sum of a first difference between the sample image and the first final image, a second difference between the sample image and the second final image, a third difference between the first intermediate image and the second intermediate image.

The first artificial intelligence model is configured to be learned based on: the weighted sum in which a weight greater than the third difference is applied to each of the first difference and the second difference.

The first intermediate image and the second intermediate image have a first resolution, and wherein the sample image, the first final image, and the second final image have a second resolution greater than the first resolution.

The memory is configured to further store a second artificial intelligence model, wherein the processor is configured to: obtain an output image having the same resolution as the input image by inputting the input image to the second artificial intelligence model, and control the communication interface to transmit the output image to another electronic apparatus, wherein the second artificial intelligence model is configured to be learned based on: a third intermediate image obtained by inputting the sample image, the first intermediate image and the second intermediate image into the second artificial intelligence model, and a third final image obtained by inputting the third intermediate image to the upscaling network.

The second artificial intelligence model is configured to be learned based on: a weighted value of a fourth difference between the sample image and the third final image, and a fifth difference between the first intermediate image and the third intermediate image.

According to an example embodiment of the disclosure, an electronic apparatus includes: a communication interface comprising communication circuitry, a memory configured to store an upscaling network of a first artificial intelligene model, a display, and a processor connected to the memory and the communication interface and configured to control the electronic apparatus to: receive an image from another electronic apparatus through the communication interface, obtain an output image in which the received image is upscaled by inputting the received image to the upscaling network, and control the display to display the output image, wherein the first artificial intelligence model is configured to be learned based on: a sample image, a first intermediate image obtained by inputting the sample image to a downscaling network of the first artificial intelligence model, a first final image obtained by inputting the first intermediate image to the upscaling network of the first artificial intelligene model, a second intermediate image in which the sample image is downscaled by a legacy scaler, and a second final image in which the first intermediate image is upscaled by the legacy scaler.

The processor is configured to: decode the received image, obtain an output image in which the decoded image is upscaled by inputting the decoded image to the upscaling network.

The first artificial intelligence model is configured to be learned based on: a weighted sum of a first difference between the sample image and the first final image, a second difference between the sample image and the second final image, a third difference between the first intermediate image and the second intermediate image.

According to an example embodiment of the disclosure, an electronic system includes: a first electronic apparatus configured to: obtain an image in which an input image is downscaled by inputting the input image to a downscaling network of an artificial intelligence model, and a second electronic apparatus configured to: receive the downscaled image from the first electronic apparatus, obtain an image in which the image is upscaled by inputting the received image to an upscaling network of the artificial intelligence model, and display the upscaled image, wherein the artificial intelligene model is configured to be learned based on: a sample image, a first intermediate image obtained by inputting the sample image to the downscaling network, a first final image obtained by inputting the first intermediate image to the upscaling network, a second intermediate image in which the sample image is downscaled by a legacy scaler, and a second final image in which the first intermediate image is upscaled by the legacy scaler.

According to an example embodiment of the disclosure, a method of controlling an electronic apparatus includes: obtaining an output image in which an input image is downscaled by inputting the input image to a downscaling network of a first artificial intelligence model, and transmitting the output image to another electronic apparatus, wherein the first artificial intelligene model is configured to be learned based on: a sample image, a first intermediate image obtained by inputting the sample image to the downscaling network, a first final image obtained by inputting the first intermediate image to an upscaling network of the first artificial intelligene model, a second intermediate image in which the sample image is downscaled by a legacy scaler, and a second final image in which the first intermediate image is upscaled by the legacy scaler.

The method further comprising: encoding the output image, wherein the transmitting includes transmitting the encoded output image to the another electronic apparatus.

The first artificial intelligence model is configured to be learned based on: a weighted sum of a first difference between the sample image and the first final image, a second difference between the sample image and the second final image, a third difference between the first intermediate image and the second intermediate image.

The first artificial intelligence model is configured to be learned based on: the weighted sum in which a weight greater than the third difference is applied to each of the first difference and the second difference.

The first intermediate image and the second intermediate image have a first resolution, and wherein the sample image, the first final image, and the second final image have a second resolution greater than the first resolution.

According to various example embodiments of the disclosure as described above, as the electronic apparatus processes the image using the artificial intelligence model learned based on a case where the device receiving the image uses a legacy scaler and transmits the processed image, even if the device receiving the image uses the legacy scaler, a restoration performance of an image may be maintained.

In addition, as the electronic apparatus processes the image using an artificial intelligence model that improves image quality, the electronic apparatus may transmit an image without downscaling the image, and may provide the user with a choice on whether to downscale the image.

In addition, the artificial intelligence model for improving the image quality may also be an artificial intelligence model learned based on the case where the device receiving the image uses the legacy scaler, and the image restoration performance may be maintained even if the device receiving the image uses the legacy scaler.

BRIEF DESCRIPTION OF THE DRAWINGS

The above and other aspects, features and advantages of certain embodiments of the present disclosure will be more apparent from the following detailed description, taken in conjunction with the appended drawings, in which.

DETAILED DESCRIPTION

Figure 1A:
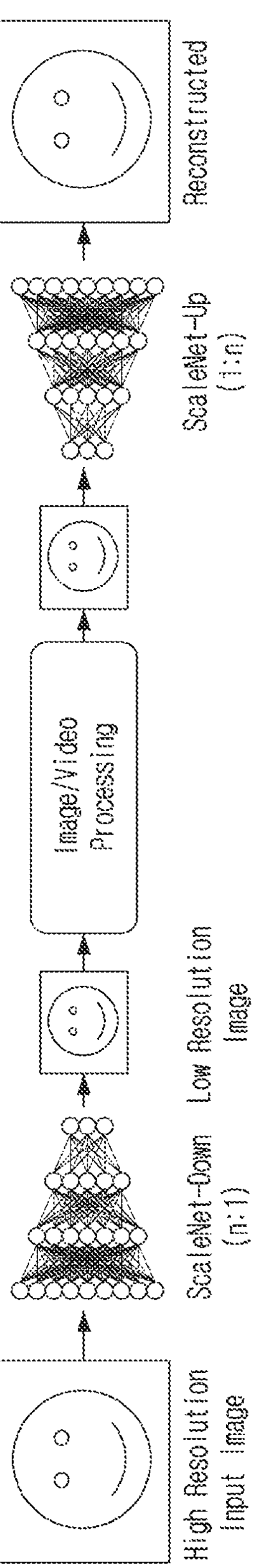
FIGS. 1A and 1B are views illustrating the related art.
Figure 1B:
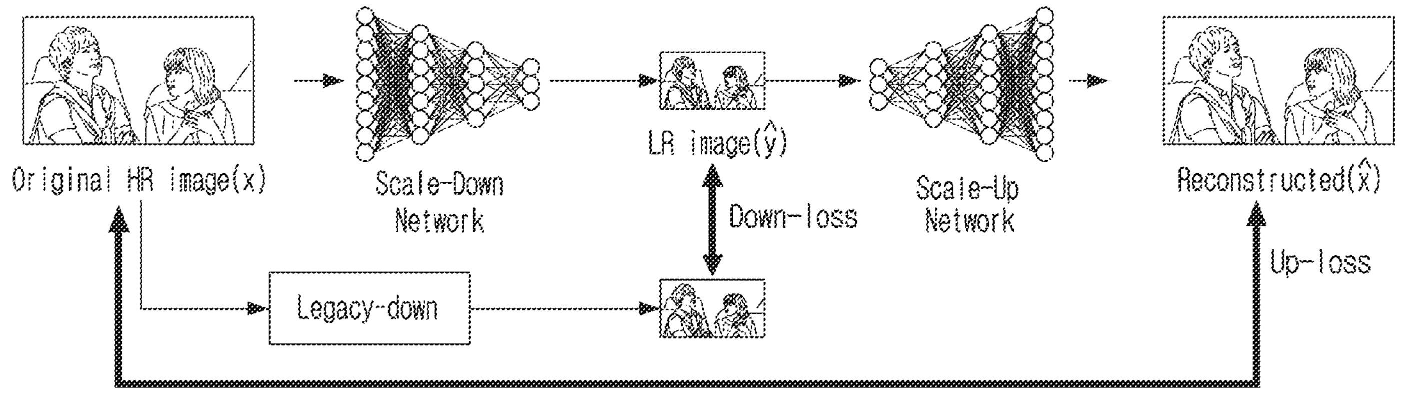

Hereinafter, the disclosure will be described in greater detail with reference to the accompanying drawings.

Various example embodiments of the present disclosure may be diversely modified. Accordingly, various example embodiments are illustrated in the drawings and are described in detail in the detailed description. However, it is to be understood that the present disclosure is not limited to a specific example embodiment, but includes all modifications, equivalents, and substitutions without departing from the scope and spirit of the present disclosure. Also, well-known functions or constructions may not described in detail where they may obscure the disclosure with unnecessary detail.

Terms used in the disclosure are selected as general terminologies currently widely used in consideration of the configuration and functions of the disclosure, but can be different depending on intention of those skilled in the art, a precedent, appearance of new technologies, and the like. Further, in various cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The terms “have”, “may have”, “include”, and “may include” used in the embodiments of the disclosure indicate the presence of corresponding features (for example, elements such as numerical values, functions, operations, or parts), and do not preclude the presence of additional features.

In the description, the term “A or B”, “at least one of A or/and B”, or “one or more of A or/and B” may include all possible combinations of the items that are enumerated together.

The expression “1”, “2”, “first”, or “second” as used herein may modify a variety of elements, irrespective of order and/or importance thereof, and only to distinguish one element from another. Accordingly, without limiting the corresponding elements.

Singular forms are intended to include plural forms unless the context clearly indicates otherwise. The terms “include”, “comprise”, “is configured to,” etc., of the description are used to indicate that there are features, numbers, steps, operations, elements, parts or combination thereof, and they should not exclude the possibilities of combination or addition of one or more features, numbers, steps, operations, elements, parts or a combination thereof.

Also, the term “user” may refer to a person who uses an electronic apparatus or an apparatus (e.g., an artificial intelligence (AI) electronic apparatus) that uses the electronic apparatus.

Hereinafter, various example embodiments will be described in greater detail with reference to the accompanying drawings.

Figure 2:
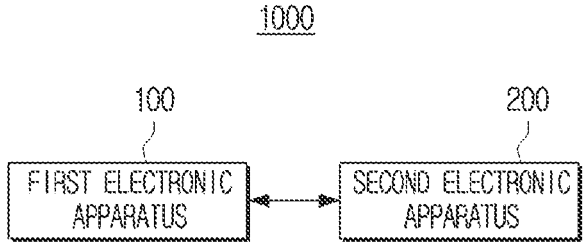
FIG. 2 is a block diagram illustrating an example configuration of an electronic system according to various embodiments.

FIG. 2 is a block diagram illustrating an example configuration of an electronic system 1000 according to various embodiments. An electronic system 1000 may include a first electronic apparatus 100 and a second electronic apparatus 200.

The first electronic apparatus 100 may include a device that processes an image through an artificial intelligence model and transmits the processed image to the second electronic apparatus 200, and may include, for example, and without limitation, a server, a TV, a set-top box (STB), a computer body, a desktop PC, laptops, video walls, large format display (LFD), digital signage, digital information display (DID), projector display, digital video disk (DVD) player, smartphone, tablet PC, monitor, smart glasses, a smart watch, or the like. The image processing may include at least one of downscaling or image quality correction.

However, the disclosure is not limited thereto, and any device may be used as the first electronic apparatus 100 as long as it is capable of processing an image through an artificial intelligence model and providing the processed image.

The first electronic apparatus 100 may encode the processed image and transmit the encoded image to the second electronic apparatus 200.

The first electronic apparatus 100 may process not only an image but also a video through the artificial intelligence model, and transmit the processed video to the second electronic apparatus 200.

The second electronic apparatus 200 may receive an image from the first electronic apparatus 100, upscale the received image through the artificial intelligence model, and display the upscaled image, and may include a display such as, for example, and without limitation, a TV, a desktop PC, a laptop, video wall, large format display (LFD), digital signage, digital information display (DID), projector display, digital video disk (DVD) player, smartphone, tablet PC, monitor, smart glasses, a smart watch or the like, and may be a device directly displaying an upscaled image.

The second electronic apparatus 200 may include a device that receives an image from the first electronic apparatus 100, upscales the received image through an artificial intelligence model, and provides the upscaled image to a device equipped with a display. As such, it may include a device such as, for example, and without limitation, a set-top box (STB), a computer body, or the like.

However, the disclosure is not limited thereto, and any device may be used as the second electronic apparatus 200 as long as it is capable of receiving an image from the first electronic apparatus 100 and upscaling the received image through the artificial intelligence model.

The second electronic apparatus 200 may decode the received image and upscale the decoded image through the artificial intelligence model.

The second electronic apparatus 200 may receive a video from the first electronic apparatus 100 and upscale the received video through the artificial intelligence model.

Figure 3:
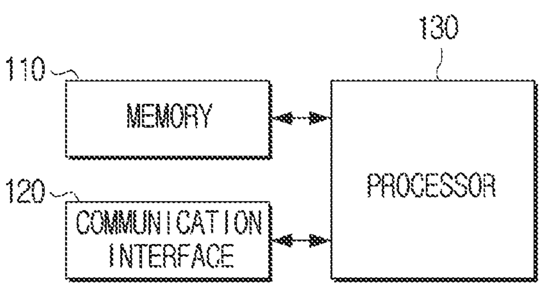
FIG. 3 is a block diagram illustrating an example configuration of a first electronic apparatus according to various embodiments.

FIG. 3 is a block diagram illustrating an example configuration of a first electronic apparatus according to various embodiments.

Referring to FIG. 3, the first electronic apparatus 100 includes a memory 110, a communication interface (e.g., including communication circuitry) 120, and a processor (e.g., including processing circuitry) 130. However, this should not be considered as limiting, and the first electronic apparatus 100 may be implemented in a form in which some components are excluded and/or other components added.

At least one of a downscaling network of the first artificial intelligence model or the second artificial intelligence model may be stored in the memory 110.

The first artificial intelligence model may include a downscaling network and an upscaling network. The downscaling network and the upscaling network of the first artificial intelligence model may be learned based, for example, and without limitation, on a sample image, a first intermediate image obtained by inputting the sample image to the downscaling network, a first final image obtained by inputting the first intermediate image to the upscaling network of the first artificial intelligence model, a second intermediate image in which the sample image is downscaled by the legacy scaler, and a second final image with the first intermediate image upscaled by legacy scaler. The first intermediate image and the second intermediate image may have a first resolution, and the sample image, the first final image, and the second final image may have a second resolution greater than the first resolution.

For example, the first artificial intelligence model may be learned based, for example, and without limitation, on: a weighed sum of a first difference between the sample image and the first final image, a second difference between the sample image and the second final image, and a third difference between the first intermediate image and the second intermediate image. The first artificial intelligence model may be learned based, for example and without limitation, on: the weighted sum in which a weight greater than the third difference is applied to each of the first difference and the second difference.

The second artificial intelligence model may include an artificial intelligence model that corrects an image quality, and may be learned based, for example, and without limitation, on: a third intermediate image obtained by inputting the sample image, the first intermediate image, and the second intermediate image to the second artificial intelligence model, and a third final image obtained by inputting the third intermediate image to the upscaling network of the first artificial intelligence model. The third intermediate image may have a first resolution, and the third final image may have a second resolution.

For example, the second artificial intelligence model may be learned based, for example, and without limitation, on: a weighted sum of a fourth difference between the sample image and the third final image, and a fifth difference between the first intermediate image and the third intermediate image.

The first artificial intelligence model and the second artificial intelligence model may be learned in an external device such as a server. However, the disclosure is not limited thereto, and the first electronic apparatus 100 may learn the first artificial intelligence model and the second artificial intelligence model, and the learning method will be described below.

The communication interface 120 may include various circuitry (e.g., communication circuitry) for performing communication with various devices. For example, the communication interface 120 may support various wired communication methods such as HDMI, MHL, USB, RGB, D-SUB, DVI, or the like. In addition, the communication interface 120 may support various wireless communication methods such as Bluetooth (BT), Bluetooth Low Energy (BLE), Wireless Fidelity (WI-FI), ZigBee, or the like. However, the disclosure is not limited thereto, and any communication standard capable of communicating with an external device may be used.

The communication interface 120 may transmit an image processed by the artificial intelligence model to the second electronic apparatus 200 under the control of the processor 130.

The processor 130 may include various processing circuitry and controls a general operation of the first electronic apparatus 100. For example, the processor 130 may be connected to each component of the first electronic apparatus 100 to control the overall operation of the first electronic apparatus 100. For example, the processor 130 may be connected to the memory 110 and the communication interface 120 to control the operation of the first electronic apparatus 100.

According to an embodiment, the processor 130 may, for example, and without limitation, be implemented as a digital signal processor (DSP), a microprocessor, a time controller (TCON), a dedicated processor, or the like. However, the disclosure is not limited thereto, and the processor 130 may include, for example, and without limitation, at least one of a central processing unit (CPU), micro controller unit (MPU), micro processing unit (MPU), controller, application processor (AP), communication processor (CP), ARM processor, or the like, or may be defined as the corresponding term. In addition, the processor 130 may be implemented as a System on Chip (SoC), large scale integration (LSI) in which a processing algorithm is embedded, or a Field programmable gate array (FPGA).

The processor 130 may control the communication interface 120 to input the input image to the down-scaling network, obtain an output image in which the input image is downscaled, and transmit the output image to the second electronic apparatus 200. In other words, the processor 130 may reduce a resolution of the input image through the downscaling network and transmit it to the second electronic apparatus 200 together with additional information, thereby reducing the amount of data transmission.

The processor 130 may control the communication interface 120 to encode the output image and transmit the encoded output image to the second electronic apparatus 200. Through this operation, it may further reduce the amount of data transmission compared to a case where encoding is not performed.

The processor 130 may control the communication interface 120 to input the input image to the second artificial intelligence model to obtain an output image having the same resolution as the input image, and to transmit the output image to the second electronic apparatus 200. In other words, the processor 130 may correct a quality of the input image and transmit the corrected image to the second electronic apparatus 200. In this case, the amount of data transmission is not reduced, but a second electronic apparatus 200 to be described below may provide a more appropriately corrected or converted image to perform an upscaling operation.

In addition, the processor 130 may control the communication interface 120 to input an input image to the second artificial intelligence model to obtain an output image having the same resolution as the input image, encode the output image, and transmit the encoded output image to the second electronic apparatus 200.

The processor 130 may process the input image using one of the downscaling network of the first artificial intelligence model and the second artificial intelligence model according to the user input.

The processor 130 may process the input image using one of the downscaling network of the first artificial intelligence model and the second artificial intelligence model based on at least one of the input image or the transmission bandwidth.

For example, if the resolution of the input image is greater than or equal to a threshold resolution, the processor 130 may process the input image using the downscaling network of the first artificial intelligence model, and if the resolution of the input image is less than the threshold resolution, the processor 130 may process the input image using the artificial intelligence model. The processor 130 may process the input image using one of the downscaling network of the first artificial intelligence model and the second artificial intelligence model by comparing the size and transmission bandwidth of the input image.

Figure 4:
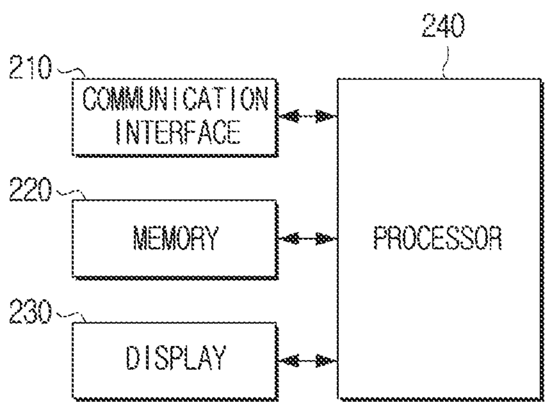
FIG. 4 is a block diagram illustrating an example configuration of a second electronic apparatus according to various embodiments.

FIG. 4 is a block diagram illustrating an example configuration of the second electronic apparatus 200 according to various embodiments.

According to FIG. 4, the second electronic apparatus 200 includes a communication interface (e.g., including communication circuitry) 210, a memory 220, a display 230, and a processor (e.g., including processing circuitry) 240. However, the disclosure is not limited thereto, and the second electronic apparatus 200 may be implemented in a form in which some components are excluded and/or additional components included.

The communication interface 210 may include various circuitry (e.g., communication circuitry) for performing communication with various devices. For example, the communication interface 210 may support various wired communication methods such as HDMI, MHL, USB, RGB, D-SUB, DVI, or the like. In addition, the communication interface 210 may support various wireless communication methods such as Bluetooth (BT), Bluetooth low energy (BLE), Wireless Fidelity (WI-FI), ZigBee, or the like. However, the disclosure is not limited thereto, and any communication standard capable of communicating with an external device may be used.

The communication interface 210 may receive an image from the first electronic apparatus 100 under the control of the processor 240. The received image may include an image processed by the artificial intelligence model, an encoded image after being processed by the artificial intelligence model, or the like.

The upscaling network of the first artificial intelligence model may be stored in the memory 220, and since this has been described above, a redundant description thereof may not be repeated here.

The display 230 may be implemented asvarious types of displays, such as, for example, and without limitation, a liquid crystal display (LCD), an organic light emitting diodes (OLED) display, a plasma display panel (PDP), or the like. The display 230 may include a driving circuit, a backlight unit, and the like which may be implemented in forms such as an a-si TFT, a low temperature poly silicon (LTPS) TFT, an organic TFT (OTFT), and the like. The display 230 may be realized as a flexible display, a 3-dimensional (3D) display, or the like.

The display 230 may display images under control of the processor 240.

The processor 240 may include various processing circuitry and controls a general operation of the electronic apparatus 200. The processor 240 may be connected to each component of the second electronic apparatus 200 to control the overall operation of the first electronic apparatus 100. For example, the processor 240 may be connected to the communication interface 210, the memory 220, and the display 230 to control the operation of the second electronic apparatus 200.

According to an embodiment, the processor 240 may, for example, and without limitation, be implemented as a digital signal processor (DSP), a microprocessor, a time controller (TCON), a dedicated processor, or the like. However, the disclosure is not limited thereto, and the processor 130 may include, for example, and without limitation, at least one of a central processing unit (CPU), micro controller unit (MPU), micro processing unit (MPU), controller, application processor (AP), communication processor (CP), ARM processor, or the like, or may be defined as the corresponding term. In addition, the processor 130 may be implemented as a System on Chip (SoC), large scale integration (LSI) in which a processing algorithm is embedded, or a Field programmable gate array (FPGA).

The processor 240 may receive an image from the first electronic apparatus 100 through the communication interface 210, input the received image to an upscaling network to obtain an output image in which the received image is upscaled, and control the display 230 to display the output image.

The processor 240 may decode the received image and input the decoded image to the upscaling network to obtain an output image in which the decoded image is upscaled.

As described above, as the first electronic apparatus 100 and the second electronic apparatus 200 may use the first artificial intelligence model that additionally learns the upscaled image by a legacy scaler, an image with improved image quality may be provided to the user. Although a device having only the legacy scaler may receive an image and upscales the received image through the legacy scaler, it may provide an image with improved image quality.

Hereinafter, an operation of the electronic system 1000 will be described in greater detail below with reference to FIGS. 5, 6, 7, 8A, 8B, 8C, 9A, 9B and 10 (which may be referred to hereinafter as FIGS. 5 to 10). FIGS. 5 to 10 describe various example embodiments and will be described for convenience of description. However, the various embodiments of FIGS. 5 to 10 may be embodied in any combination.

Figure 5:
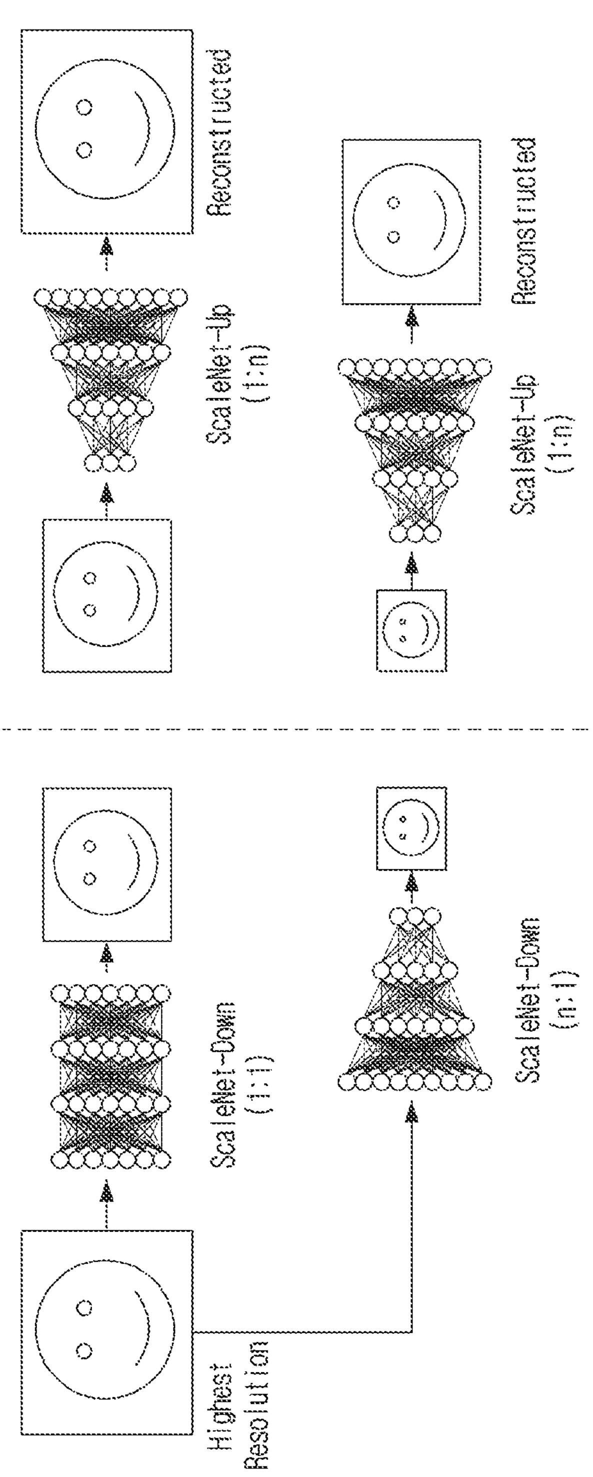
FIG. 5 is a diagram illustrating example operations of a first electronic apparatus and a second electronic apparatus according to various embodiments.

FIG. 5 is a diagram illustrating example operations of the first electronic apparatus 100 and the second electronic apparatus 200 according to various embodiments.

The processor 130 of the first electronic apparatus 100 may downscale the input image using the downscaling network (ScaleNet-Down (n:1)) of the first artificial intelligence model or the second artificial intelligence model (ScaleNet-Down). (1:1)) to improve a quality of the input image. When the downscaling network (ScaleNet-Down (n:1)) of the first artificial intelligence model is used, there is an advantage of reducing the amount of data transmission, and when the second artificial intelligence model (ScaleNet-Down (1:1)) is used, there is an advantage of providing a higher quality image. The image quality improvement may refer, for example to, among an image obtained by upscaling an image before the image quality improvement and an image obtained by upscaling an image after the image quality improvement, the latter having less noise.

The processor 240 of the second electronic apparatus 200 may upscale the image received from the first electronic apparatus 100 using the upscaling network (ScaleNet-Up (1:n)) of the first artificial intelligence model. In other words, the processor 240 may perform the upscaling operation regardless of a cited intelligence model used by the first electronic apparatus 100.

The downscaling network and the upscaling network of the first artificial intelligence model are simultaneously learned, which will be described in greater detail below with reference to FIG. 6.

Figure 6:
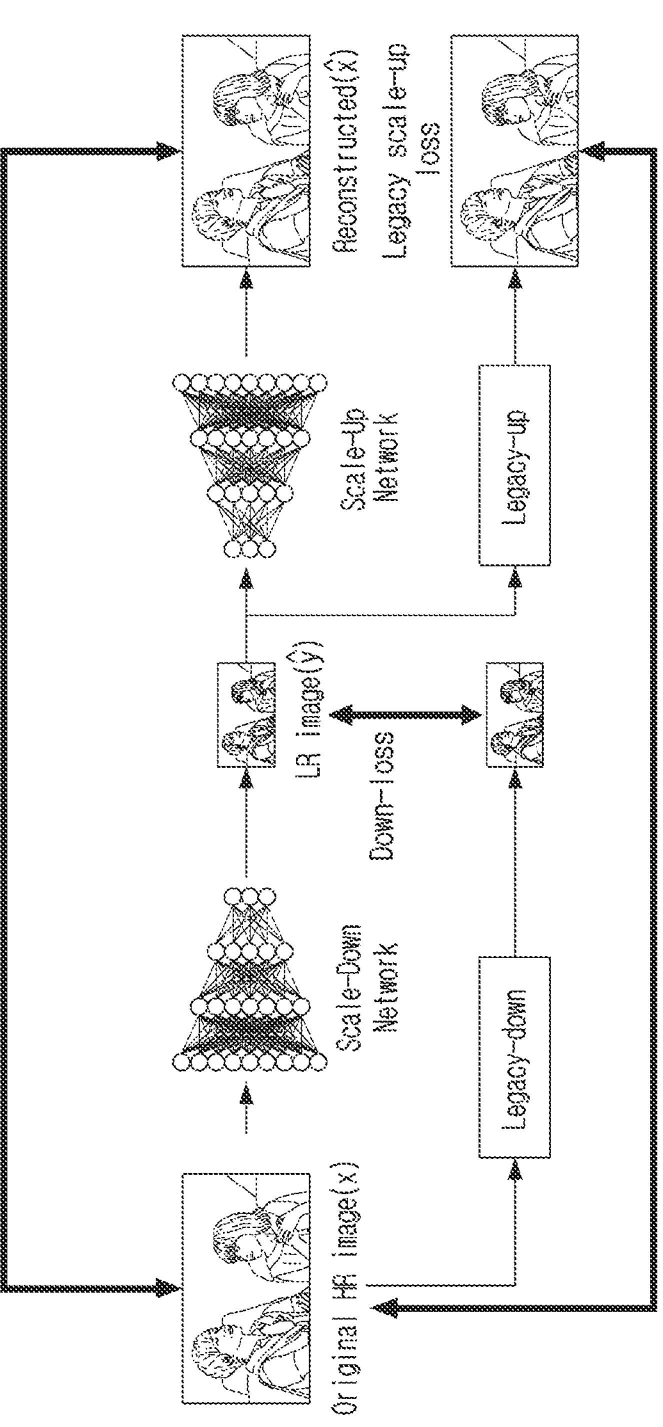
FIG. 6 is a diagram illustrating an example method of learning a first artificial intelligence model according to various embodiments.

FIG. 6 is a diagram illustrating an example method of learning a first artificial intelligence model according to various embodiments.

The server may learn the first artificial intelligence model. For example, the server may input a sample image on the left into a downscaling network (e.g., Scale-Down Network) of the first artificial intelligence model to obtain a first intermediate image, and input the first intermediate image into an upscaling network (e.g., Scale-Up Network) of the first artificial intelligence model to obtain a first final image.

In addition, the server may downscale the sample image through the legacy scaler (e.g., Legacy-down) to obtain a second intermediate image, and obtain a second final image obtained by upscaling the first intermediate image through the legacy scaler (e.g., Legacy-up). The legacy scaler may be a conventional rule-based scaler. The rule-based scaler may be a scaler that upscales or downscales an image according to a predetermined method. However, the disclosure is not limited thereto, and the rule-based scaler may upscale or downscale an image through a neural network previously learned through machine learning or deep learning.

The server may learn the first artificial intelligence model based on the sample image, the first intermediate image, the second intermediate image, the first final image, and the second final image. For example, the server may learn the first artificial intelligence model based on: a weighted sum of a first difference between the sample image and the first final image, a second difference between the sample image and the second final image, and a third difference between the first intermediate image and the second intermediate image. For example, the server may learn the first artificial intelligence model based on: the weighted sum in which a weight greater than the third difference is applied to each of the first difference and the second difference.

In other words, the server may learn the first artificial intelligence model using the second difference more than the related art. Accordingly, after the input image is downscaled through the downscaling model of the first artificial intelligence model, even if the downscaled input image is upscaled through the legacy scaler, a result similar to a quality of the input image may be obtained.

Referring to FIG. 6, the server performs a learning operation and the first electronic apparatus 100 and the second electronic apparatus 200 use the same, but the disclosure is not limited thereto. For example, the learning operation of FIG. 6 may be performed by at least one of the first electronic apparatus 100 or the second electronic apparatus 200.

Figure 7:
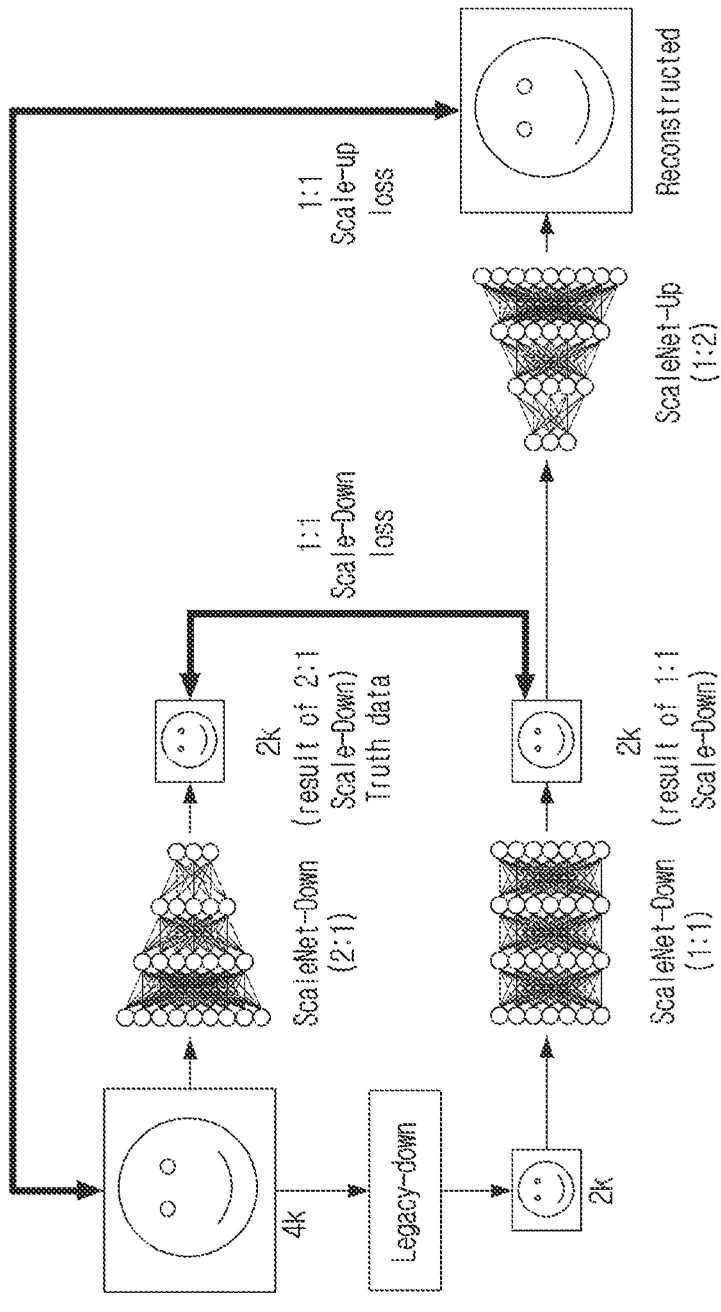
FIG. 7 is a diagram illustrating an example learning method of a second artificial intelligence model according to various embodiments.

FIG. 7 is a diagram illustrating an example learning method of a second artificial intelligence model according to various embodiments.

The server may learn the second artificial intelligence model. In this case, the server may learn the second artificial intelligence model using the first artificial intelligence model on which the learning has been completed. The upper left (ScaleNet-Down (2:1)) of FIG. 7 may include a downscaling network of the first artificial intelligence model, and the right (ScaleNet-Up (1:2)) of FIG. 7 is an upscaling network of the first artificial intelligence model, and the lower left (ScaleNet-Down (1:1)) of FIG. 7 may be the second artificial intelligence model.

The server inputs the upper left sample image 4 k into the downscaling network of the first artificial intelligence model to obtain a first intermediate image, and to obtain downscaling the sample image through the legacy scaler to obtain a second intermediate image 2 k.

The server may input the second intermediate image to the second artificial intelligence model to obtain a third intermediate image 2k, and input the third intermediate image to the up scaling network of the first artificial intelligence model to obtain a third final image.

The server may learn the second artificial intelligence model based on: the sample image, the first intermediate image, the third intermediate image, and the third final image. For example, the server may learn the second artificial intelligence model based on: a weighted sum of the fourth difference between the sample image and the third final image and a fifth difference between the first intermediate image and the third intermediate image.

In a learning process, learning may be performed using a relatively high-quality sample image 4k, but after learning is completed, image quality improvement may be performed using just the second artificial intelligence model. In other words, when the second artificial intelligence model is used, the image quality may be improved while maintaining a resolution.

This is so that the third intermediate image 2k obtained by inputting the relatively low-quality second intermediate image into the second artificial intelligence model is to become similar to the first intermediate image obtained by downscaling the relatively high-quality sample image 4k.

Referring to FIG. 7, it has been described that the server performs the learning operation and the first electronic apparatus 100 and the second electronic apparatus 200 use the same, but the disclosure is not limited thereto. For example, a learning operation of FIG. 7 may be performed by at least one of the first electronic apparatus 100 or the second electronic apparatus 200.

Figure 8A:
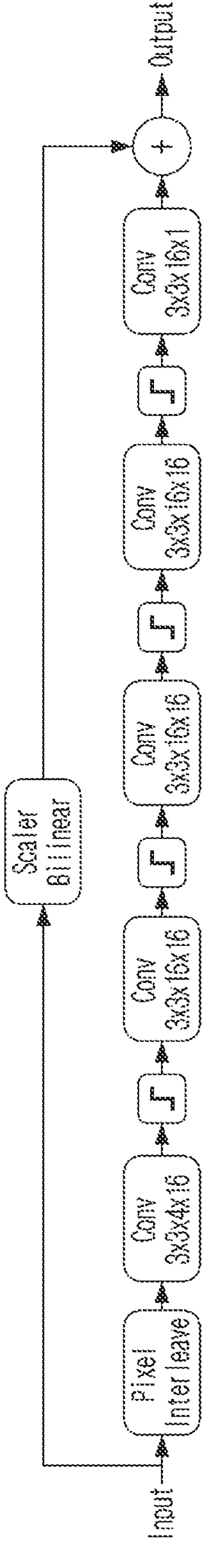
FIGS. 8A, 8B and 8C are diagrams illustrating various types of artificial intelligence models according to various embodiments.
Figure 8B:
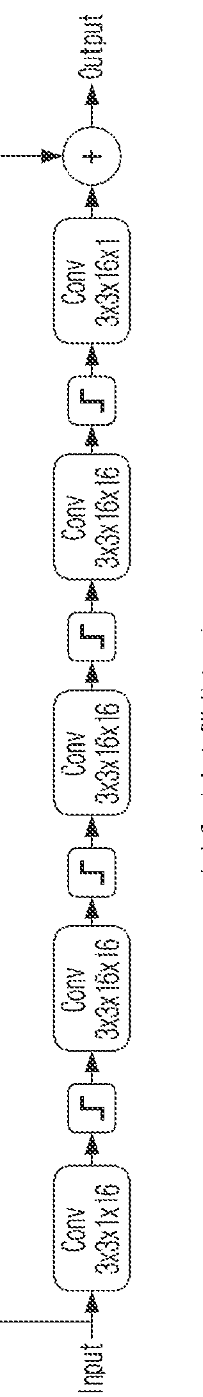
Figure 8C:
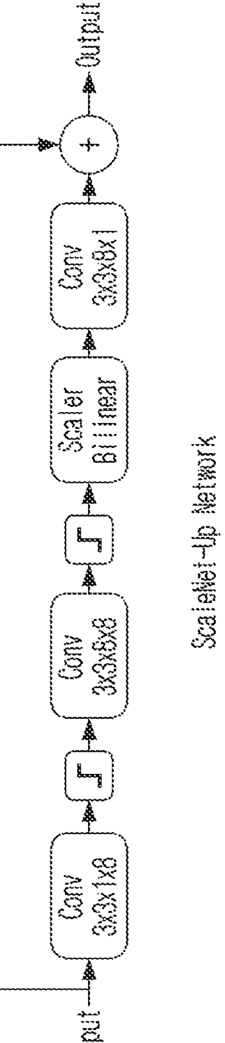

FIGS. 8A, 8B and 8C are diagrams illustrating various types of artificial intelligence models according to various embodiments.

FIG. 8A illustrates a downscaling network of a first artificial intelligence model (e.g., 2:1 ScaleNet-DN Network), FIG. 8B illustrates a second artificial intelligence model (e.g., 1:1 ScaleNet-DN Network), and FIG. 8C illustrates an upscaling network (e.g., ScaleNet-Up Network) of the first artificial intelligence model.

The form of such a network is not limited to FIGS. 8A, 8B and 8C and may be implemented in various forms.

Figure 9A:
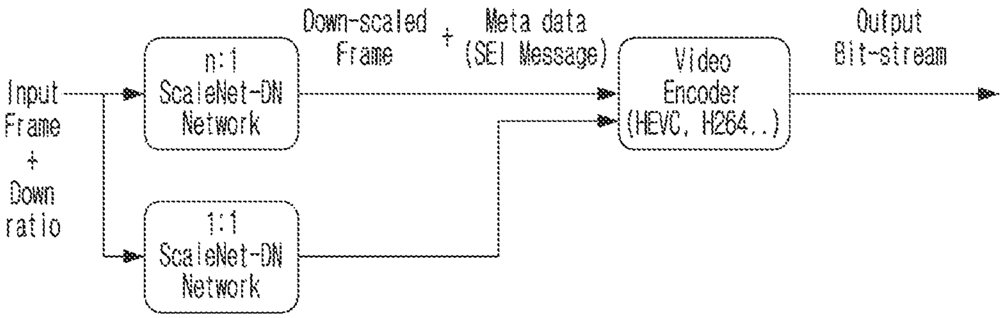
FIGS. 9A and 9B are diagrams illustrating an example encoding operation according to various embodiments.
Figure 9B:
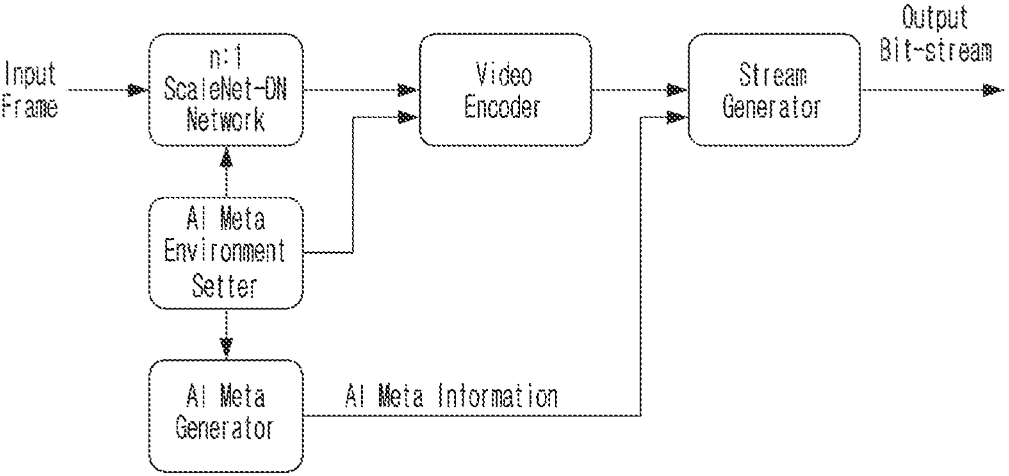

FIGS. 9A and 9B are diagrams illustrating an example encoding operation according to various embodiments.

As shown in FIG. 9A, the processor 130 of the first electronic apparatus 100 may downscale an input image or improve image quality. For example, the processor 130 may downscale the input image using the downscaling network (ScaleNet-Down (n:1 or n:1 ScaleNet-DN Network)) of the first artificial intelligence model or improve the quality of the input image using the second artificial intelligence model (ScaleNet-Down (1:1) or 1:1 ScaleNet-DN Network)

The processor 130 may downscale the input image or improve image quality based on a network state.

The processor 130 may encode the processed image. Through this operation, data to be transmitted may be reduced. For example, when encoding an input image after downscaling, data to be transmitted may be significantly reduced.

As shown in FIG. 9B, when downscaling an input image, the processor 130 may transmit metadata (e.g., SEI Message) related to downscaling to the second electronic apparatus 200.

For example, the processor 130 may downscale the input image based on a value set by an AI meta environment setter, and encode the downscaled image using the set value. The value set by the AI meta environment setter may include, for example, and without limitation, a scaling ratio. In addition, when there are a plurality of types of downscaling networks, the value set by the AI meta environment setter may include information on the downscaling network.

The processor 130 may acquire AI meta information corresponding to the set value through a AI meta generator, and transmit the encoded image and AI meta information to the second electronic apparatus 200 through a stream generator.

Figure 10:
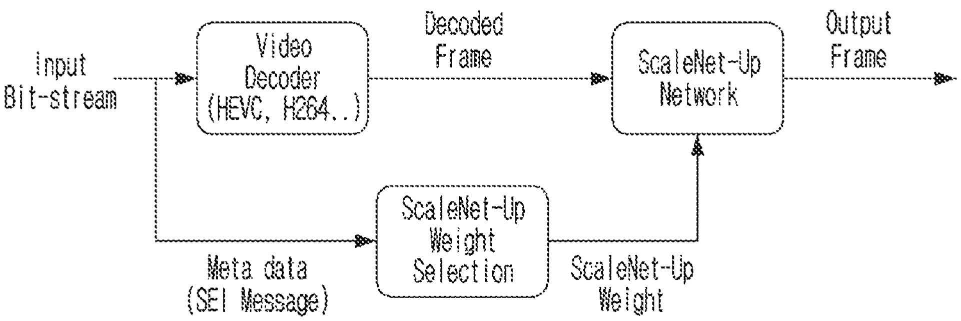
FIG. 10 is a diagram illustrating an example decoding operation according to various embodiments.

FIG. 10 is a diagram illustrating an example decoding operation according to various embodiments.

As illustrated in FIG. 10, the processor 240 of the second electronic apparatus 200 may receive an image and metadata (SEI Message) from the first electronic apparatus 100.

The processor 240 may decode the image and upscale the decoded image. Here, the processor 240 may upscale the decoded image based on the received metadata.

However, the disclosure is not limited thereto, and the processor 240 may change the upscaling method based on at least one of a resource state of the second electronic apparatus 200 and a network state with the first electronic apparatus 100. For example, the processor 240 may upscale the decoded image through the legacy scaler based on at least one of the resource state of the second electronic apparatus 200 and the network state with the first electronic apparatus 100.

Figure 11:
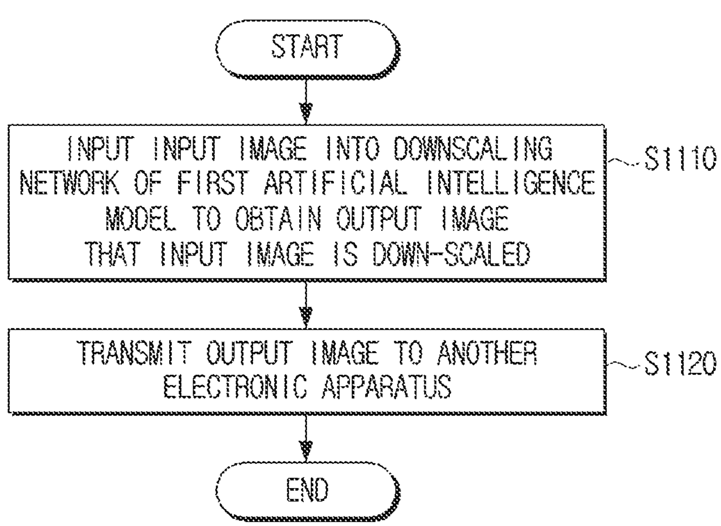
FIG. 11 is a flowchart illustrating an example method of controlling a first electronic apparatus according to various embodiments.

FIG. 11 is a flowchart illustrating an example method of controlling a first electronic apparatus according to various embodiments.

The input image may input an input image to a downscaling network of the first artificial intelligence model to obtain an output image in which the input image is downscaled (S1110). The output image may be transmitted to the other electronic apparatus (S1120).

The first artificial intelligence model may be an artificial intelligence model learned based on: a sample image, a first intermediate image obtained by inputting the sample image to the downscaling network, a first final image obtained by inputting the first intermediate image to the up scaling network of the first artificial intelligence model, a second intermediate image in which the sample image is downscaled by the legacy scaler, and a second final image in which the first intermediate image is upscaled by the legacy scaler.

The method may further include encoding the output image, and the operation of transmitting (S1120) may transmit the encoded output image to the other electronic apparatus.

The first artificial intelligence model may be learned based on: a weighted sum of the first difference between the sample image and the first final image, the second difference between the sample image and the second final image, and the third difference between the first intermediate image and the second intermediate image.

In addition, the first artificial intelligence model may be learned based on: a weighted sum in which a weight greater than the third difference is applied to each of the first difference and the second difference.

The first intermediate image and the second intermediate image may have a first resolution, and the sample image, the first final image, and the second final image may have a second resolution greater than the first resolution.

The method may further include inputting the input image into the second artificial intelligence model to obtain an output image having the same resolution as the input image, and the operation of transmitting (S1120) may transmit the output image to the other electronic apparatus.

The second artificial intelligence model may be an artificial intelligence model based on: a third intermediate image obtained by inputting a sample image, a first intermediate image, and a second intermediate image to the second artificial intelligence model, and a third final image obtained by inputting the third intermediate image into the upscaling network.

In addition, the second artificial intelligence model may be learned based on: a weighted sum of a fourth difference between the sample image and the third final image and a fifth difference between the first intermediate image and the third intermediate image.

Figure 12:
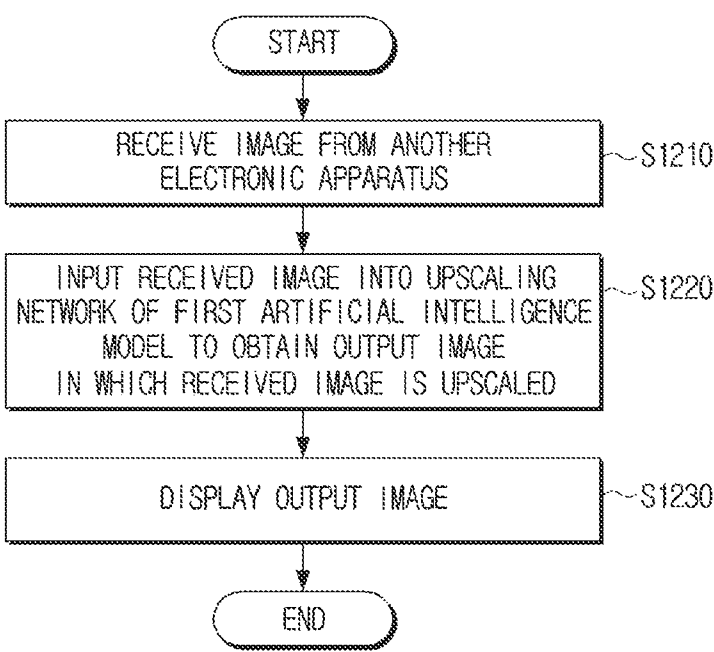
FIG. 12 is a flowchart illustrating an example method of controlling a second electronic apparatus according to various embodiments.

FIG. 12 is a flowchart illustrating an example method of controlling a second electronic apparatus according to various embodiments.

An image is received from the other electronic apparatus (S1210). The received image is input to the upscaling network of the first artificial intelligence model to obtain an output image in which the received image is upscaled (S1220). The output image is displayed (S1230).

The first artificial intelligence model may be an artificial intelligence model learned based on: a sample image, a first intermediate image obtained by inputting the sample image to the downscaling network of the first artificial intelligence model, a first final image obtained by inputting the first intermediate image to the upscaling network, a second intermediate image in which the sample image is downscaled by the legacy scaler and a second final image in which the first intermediate image is upscaled by the legacy scaler.

The method may further include decoding the received image, and the operation of obtaining (S1220) may obtain an output image in which the decoded image is upscaled by inputting the decoded image to the upscaling network.

According to various example embodiments of the disclosure as described above, as the electronic apparatus may process the image using the artificial intelligence model learned based on the device receiving the image using a legacy scaler and transmits the processed image, even if the device receiving the image uses the legacy scaler, a restoration performance of an image may be maintained.

In addition, as the electronic apparatus processes the image using an artificial intelligence model that improves image quality, the electronic apparatus may transmit an image without downscaling the image, and may provide the user with a choice on whether to downscale the image.

In addition, the artificial intelligence model for improving the image quality may also be an artificial intelligence model learned in consideration of the case where the device receiving the image uses the legacy scaler, and the image restoration performance may be maintained even if the device receiving the image uses the legacy scaler.

According to an example embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated by a compiler or a code executable by an interpreter. The machine-readable storage media may be provided in a form of a non-transitory storage media. The 'non-transitory' storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

Further, each of the components (e.g., modules or programs) according to the various embodiments described above may include a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various example embodiments, may be sequential, parallel, or both, executed iteratively or heuristically, or at least some operations may be performed in a different order, omitted, or other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic apparatus comprising:

memory configured to store a downscaling network of a first artificial intelligence model, the first artificial intelligence model comprising the downscaling network and an upscaling network;

a communication interface comprising circuitry; and at least one processor comprising processing circuitry configured to:

obtain an output image in which an input image is downscaled by inputting the input image to the downscaling network, and control the communication interface to transmit the output image and metadata corresponding to the downscaling of the input image to another electronic apparatus, the another electronic apparatus using a legacy scaler for upscaling the output image received from the electronic apparatus, wherein the downscaling network of the first artificial intelligence model is configured to be learned based on a sample image, a first intermediate image obtained by inputting the sample image to the downscaling network, a first final image obtained by inputting the first intermediate image to the upscaling network of the first artificial intelligence model, a second intermediate image in which the sample image is downscaled by the legacy scaler, and a second final image in which the first intermediate image is upscaled by the legacy scaler.

2. The electronic apparatus of claim 1, wherein the at least one processor is configured to:

encode the output image, and control the communication interface to transmit the encoded output image to the another electronic apparatus.

3. The electronic apparatus of claim 1, wherein the first artificial intelligence model is configured to be learned based on a weighted sum of a first difference between the sample image and the first final image, a second difference between the sample image and the second final image, and a third difference between the first intermediate image and the second intermediate image.

4. The electronic apparatus of claim 3, wherein the first artificial intelligence model is configured to be learned based on the weighted sum in which a weight greater than the third difference is applied to each of the first difference and the second difference.

5. The electronic apparatus of claim 1, wherein:

the first intermediate image and the second intermediate image have a first resolution, and the sample image, the first final image, and the second final image have a second resolution greater than the first resolution.

6. The electronic apparatus of claim 1, wherein the memory is configured to further store a second artificial intelligence model and wherein the at least one processor is configured to:

obtain an output image having a same resolution as the input image by inputting the input image to the second artificial intelligence model, and control the communication interface to transmit the output image to the another electronic apparatus, wherein the second artificial intelligence model is configured to be learned based on a third intermediate image obtained by inputting the sample image, the first intermediate image, and the second intermediate image into the second artificial intelligence model, and a third final image obtained by inputting the third intermediate image to the upscaling network.

7. The electronic apparatus of claim 6, wherein the second artificial intelligence model is configured to be learned based on a weighted value of a fourth difference between the sample image and the third final image, and a fifth difference between the first intermediate image and the third intermediate image.

8. A method of controlling an electronic apparatus comprising:

obtaining an output image in which an input image is downscaled by inputting the input image to a downscaling network of a first artificial intelligence model, the first artificial intelligence model comprising the downscaling network and an upscaling network; and transmitting the output image and metadata corresponding to the downscaling of the input image to another electronic apparatus, the another electronic apparatus using a legacy scaler for upscaling the output image received from the electronic apparatus, wherein the downscaling network of the first artificial intelligence model is configured to be learned based on a sample image, a first intermediate image obtained by inputting the sample image to the downscaling network, a first final image obtained by inputting the first intermediate image to an upscaling network of the first artificial intelligence model, a second intermediate image in which the sample image is downscaled by a legacy scaler, and a second final image in which the first intermediate image is upscaled by the legacy scaler.

9. The method of claim 8, further comprising:

encoding the output image, wherein the transmitting includes transmitting the encoded output image to the another electronic apparatus.

10. The method of claim 8, wherein the first artificial intelligence model is configured to be learned based on a weighted sum of a first difference between the sample image and the first final image, a second difference between the sample image and the second final image, and a third difference between the first intermediate image and the second intermediate image.

11. The method of claim 10, wherein the first artificial intelligence model is configured to be learned based on the weighted sum in which a weight greater than the third difference is applied to each of the first difference and the second difference.

12. The method of claim 8, wherein:

the first intermediate image and the second intermediate image have a first resolution, and the sample image, the first final image, and the second final image have a second resolution greater than the first resolution.

13. The method of claim 8, further comprising:

obtaining an output image having a same resolution as the input image by inputting the input image to a second artificial intelligence model, and wherein the transmitting comprises transmitting the output image to the another electronic apparatus, and wherein the second artificial intelligence model is configured to be learned based on a third intermediate image obtained by inputting the sample image, the first intermediate image, and the second intermediate image into the second artificial intelligence model, and a third final image obtained by inputting the third intermediate image to the upscaling network.

14. The method of claim 13, wherein the second artificial intelligence model is configured to be learned based on a weighted value of a fourth difference between the sample image and the third final image, and a fifth difference between the first intermediate image and the third intermediate image.

15. A non-transitory computer-readable storage medium storing instructions which, when executed by at least one processor of an electronic apparatus, cause the electronic apparatus to perform operations comprising:

obtaining an output image in which an input image is downscaled by inputting the input image to a downscaling network of a first artificial intelligence model, the first artificial intelligence model comprising the downscaling network and an upscaling network; and transmitting the output image and metadata corresponding to the downscaling of the input image to another electronic apparatus, the another electronic apparatus using a legacy scaler for upscaling the output image received from the electronic apparatus, wherein the downscaling network of the first artificial intelligence model is configured to be learned based on a sample image, a first intermediate image obtained by inputting the sample image to the downscaling network, a first final image obtained by inputting the first intermediate image to an upscaling network of the first artificial intelligence model, a second intermediate image in which the sample image is downscaled by a legacy scaler, and a second final image in which the first intermediate image is upscaled by the legacy scaler.

16. The non-transitory computer-readable storage medium of claim 15, wherein the first artificial intelligence model is configured to be learned based on a weighted sum of a first difference between the sample image and the first final image, a second difference between the sample image and the second final image, and a third difference between the first intermediate image and the second intermediate image.

17. The non-transitory computer-readable storage medium of claim 16, wherein the first artificial intelligence model is configured to be learned based on the weighted sum in which a weight greater than the third difference is applied to each of the first difference and the second difference.

* * * * *